US009855626B2

United States Patent
Tiwari et al.

(10) Patent No.: US 9,855,626 B2
(45) Date of Patent: Jan. 2, 2018

(54) FORMING A PATTERN OF APERTURES IN AN OBJECT WITH A PLURALITY OF LASER BEAMS

(71) Applicant: Rohr, Inc., Chula Vista, CA (US)

(72) Inventors: Sean Tiwari, Glendora, CA (US); Song Chiou, Irvine, CA (US)

(73) Assignee: Rohr, Inc., Chula Vista, CA (US)

( * ) Notice: Subject to any disclaimer, the term of this patent is extended or adjusted under 35 U.S.C. 154(b) by 343 days.

(21) Appl. No.: 14/609,162

(22) Filed: Jan. 29, 2015

(65) Prior Publication Data

US 2016/0221123 A1    Aug. 4, 2016

(51) Int. Cl.
| | | |
|---|---|---|
| *B23K 26/00* | (2014.01) | |
| *B23K 26/382* | (2014.01) | |
| *B23K 26/402* | (2014.01) | |
| *F01D 25/24* | (2006.01) | |
| *B23K 26/067* | (2006.01) | |
| *B23K 26/082* | (2014.01) | |
| *B23K 103/16* | (2006.01) | |

(52) U.S. Cl.
CPC ........ *B23K 26/382* (2015.10); *B23K 26/0676* (2013.01); *B23K 26/082* (2015.10); *B23K 26/402* (2013.01); *F01D 25/24* (2013.01); *B23K 2203/16* (2013.01)

(58) Field of Classification Search
CPC .......................... B23K 26/0673; B23K 26/382
USPC ........................................................ 264/400
See application file for complete search history.

(56) References Cited

U.S. PATENT DOCUMENTS

| | | | |
|---|---|---|---|
| 4,816,097 A | | 3/1989 | Williams et al. |
| 4,927,226 A | * | 5/1990 | Ortiz, Jr. ............... B23K 26/067 |
| | | | 219/121.6 |
| 5,168,454 A | * | 12/1992 | LaPlante ................ B23K 26/08 |
| | | | 219/121.7 |
| 5,378,582 A | * | 1/1995 | Chan ................... B23K 26/0608 |
| | | | 219/121.6 |
| 5,523,543 A | * | 6/1996 | Hunter, Jr. ............. G01J 1/4257 |
| | | | 219/121.62 |
| 5,541,731 A | * | 7/1996 | Freedenberg .......... B23K 26/04 |
| | | | 219/121.8 |
| 5,585,017 A | * | 12/1996 | James ................. B23K 26/0823 |
| | | | 219/121.71 |
| 5,676,866 A | * | 10/1997 | in den Baumen ..... B23K 26/04 |
| | | | 219/121.74 |
| 5,785,919 A | | 7/1998 | Wilson |
| 5,790,620 A | * | 8/1998 | Okazaki ............. B23K 26/0069 |
| | | | 134/1 |

(Continued)

FOREIGN PATENT DOCUMENTS

| | | |
|---|---|---|
| GB | 2391059 A | 1/2004 |
| WO | WO02101888 | 12/2002 |
| WO | WO2008105631 | 9/2008 |

OTHER PUBLICATIONS

EP search report for EP16153098.5 dated Nov. 7, 2016.
EP search report for EP16153098.5 dated Jun. 28, 2016.

*Primary Examiner* — Timothy Kennedy
(74) *Attorney, Agent, or Firm* — O'Shea Getz P.C.

(57) ABSTRACT

A manufacturing method is provided which utilizes a laser system. During an embodiment of this method, an object is arranged relative to a head of the laser system. A pattern of holes are formed in the object by ablating the object with a plurality of laser beams which are directed from the head.

16 Claims, 9 Drawing Sheets

(56) References Cited

U.S. PATENT DOCUMENTS

| | | | |
|---|---|---|---|
| 5,916,462 A * | 6/1999 | James | B23K 26/0823 219/121.71 |
| 6,538,230 B2 * | 3/2003 | Lawson | B23K 26/0846 219/121.67 |
| 6,625,181 B1 * | 9/2003 | Oshemkov | B23K 26/067 219/121.68 |
| 6,977,356 B2 | 12/2005 | Vaidyanathan et al. | |
| 7,822,304 B2 | 10/2010 | Hirata | |
| 8,525,073 B2 | 9/2013 | Quitter et al. | |
| 2003/0019854 A1 * | 1/2003 | Gross | B23K 26/067 219/121.73 |
| 2003/0085720 A1 * | 5/2003 | Yamazaki | H01L 21/2026 438/166 |
| 2003/0189746 A1 * | 10/2003 | Vernackt | G03F 7/2032 359/237 |
| 2004/0188393 A1 * | 9/2004 | Li | B23K 26/04 219/121.7 |
| 2006/0039057 A1 * | 2/2006 | Han | B23K 26/0736 359/216.1 |
| 2007/0075063 A1 * | 4/2007 | Wilbanks | B23K 26/03 219/121.85 |

\* cited by examiner

FORMING A PATTERN OF APERTURES IN AN OBJECT WITH A PLURALITY OF LASER BEAMS

BACKGROUND

1. Technical Field

This disclosure relates generally to laser machining and, more particularly, to forming one or more apertures in material such as, for example, a fiber-reinforced composite using a laser system.

2. Background Information

An aircraft propulsion system may include components that are constructed from structural acoustic panels. As is known to those skilled in this art, a typical acoustic panel includes a face sheet and a back sheet and at least one layer of core, such as a honeycomb core, in between the face sheet and the back sheet. The face sheet is perforated. The core, the face sheet, and back sheet together define many small acoustic chambers that are open to the air outside of the face sheet via the perforations. The chambers act to damp acoustic noise by generating an out of phase sound wave that destructively interferes with sound waves hitting the panel.

In modern aircraft, an acoustic panel is frequently constructed from a face sheet and a back sheet made of a composite system such as carbon fiber reinforced epoxy, and from a honeycomb core made from aluminum. But, of course, a variety of other materials are possible and may be selected in order to suit a particular application.

One challenge in the construction of acoustic panels is the perforation of the many small holes in the face sheet. Often the holes are on the order of 0.050 inches in diameter down to much smaller diameters, and 10-30% of the face sheet area is removed by the perforation. This means that in some components millions of holes must be formed, and this must be done in an economical and consistent, reliable fashion.

Perforation using a laser beam has been proposed, and is a very attractive option. However, even the rapid scanning and cutting capability of a laser beam may not be adequate in the case of a component which requires millions of holes.

SUMMARY OF THE DISCLOSURE

According to an aspect of the invention, a manufacturing method is provided which utilizes a laser system. During this method, an object is arranged relative to a head of the laser system. A pattern of holes are concurrently formed in the object by ablating the object with a plurality of laser beams which are directed from the head. The object is configured as at least a portion of an acoustic panel.

According to another aspect of the invention, another manufacturing method is provided which utilizes a laser system. During this method, an object is arranged relative to a head of the laser system. A pattern of apertures are formed in the object by ablating the object with a plurality of laser beams which are directed from the head. The head includes a laser beam multiplexer which redirects at least some of the laser beams such that the laser beams are directed on substantially parallel trajectories. The laser beam multiplexer is translated to adjust inter hole spacing of the pattern of holes.

According to another aspect of the invention, another manufacturing method is provided which utilizes a laser system. During this method, a plurality of laser beams are concurrently directed onto a composite object from the laser system. A pattern of apertures are formed in the composite object using the laser beams.

According to still another aspect of the invention, another manufacturing method is provided which utilizes a laser system. During this method, a plurality of apertures are concurrently formed in an object using a plurality of laser beams generated by the laser system. The laser system includes a laser beam multiplexer with which at least some of the laser beams are incident. The laser beam multiplexer is operable to translate and thereby adjust inter hole spacing of the pattern of apertures.

The pattern of holes or apertures may be a rectangular array of holes.

The object may be configured as or include a fiber-reinforced composite.

The head may include a laser beam multiplexer with which at least some of the laser beams are incident. The laser beam multiplexer may redirect at least some of the laser beams such that the laser beams are directed on substantially parallel trajectories. The laser beam multiplexer may also or alternatively be translated to adjust inter hole spacing of the pattern of holes.

The head may be moved from a first position to a second position, wherein the pattern of holes is formed while the head is in the first position. Another pattern of holes may be formed in the object by ablating the object with a plurality of laser beams which are directed from the head while the head is in the second position.

The laser beam multiplexer may be configured as or include a prismatic mirror with which at least some of the laser beams are incident.

The laser beam multiplexer may be translated to adjust inter hole spacing of the pattern of holes.

The pattern of holes or apertures may be a pattern of four holes, or nine holes, or any other number of holes.

The object may be configured as at least a portion of an acoustic panel for a turbine engine.

The laser system may include a plurality of lasers. Each laser may generate a respective one of the laser beams. Each laser beam may ablate the composite object to form a respective one of the apertures in the pattern.

The laser system may include a laser beam multiplexer which redirects at least some of the laser beams such that the laser beams are directed on substantially parallel trajectories.

The pattern of apertures may be a rectangular (e.g., square) array of holes.

The foregoing features and the operation of the invention will become more apparent in light of the following description and the accompanying drawings.

DETAILED DESCRIPTION

This disclosure includes, among other things, methods and systems to multiplex several laser beams and use them at the same time to cut multiple perforations.

Figure 1:
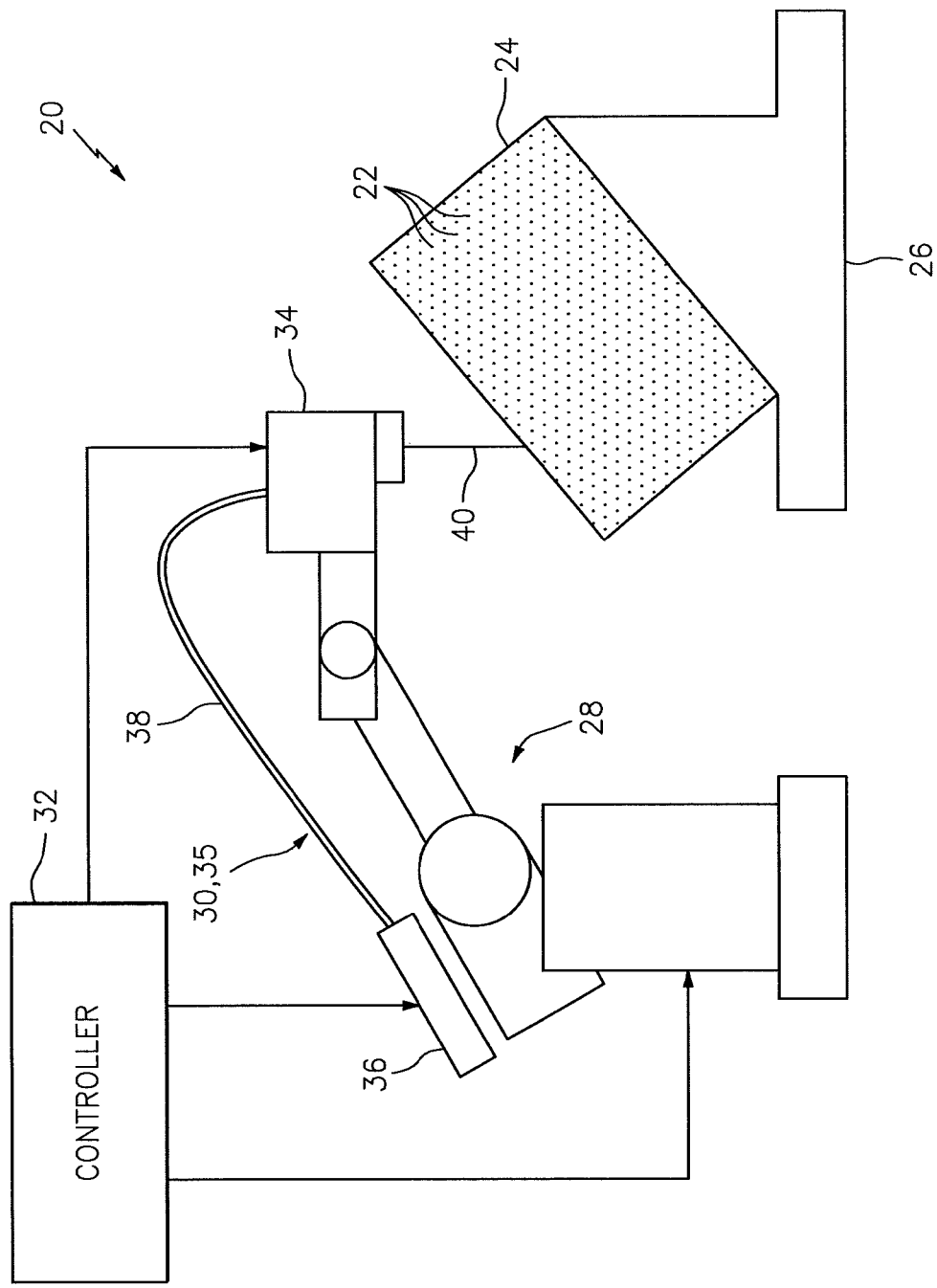
FIG. 1 is a block diagram of a system for forming apertures in an object.

FIG. 1 is a block diagram of a manufacturing system 20 for forming apertures 22 such as through-holes in an object 24, which may be configured as or include a fiber-reinforced composite layer (e.g., sheet) of an acoustic panel. The system 20 includes a base 26, a manipulator 28 and a laser system 30. The system 20 also includes a controller 32 in signal communication (e.g., hardwired and/or wirelessly coupled) with one or more of the system components 28 and 30.

The base 26 is adapted to support the object 24. The base 26 may include a jig to which the object 24 may be attached. The object 24, for example, may be mechanically fastened to the jig. The object 24 may also or alternatively be bonded to the jig. The jig may be adapted to orientate the object 24 at an angle relative to a gravitational horizon as illustrated in FIG. 1. Of course, various other types and configurations of bases are known in the art, and the system is not limited to including any particular ones thereof nor object orientations.

The manipulator 28, which may be a multi-axis manipulator, is adapted to move at least one component such as a scanner head 34 of the laser system 30 to various locations around and/or to a side of the object 24. The manipulator 28 may also be adapted to move the at least one component to various locations within the object 24; e.g., within a bore of the object 24. The manipulator 28 of FIG. 1, for example, is configured as a six-axis robotic arm. Of course, various other types and configurations of manipulators are known in the art, and the system is not limited to including any particular ones thereof.

Figure 2:
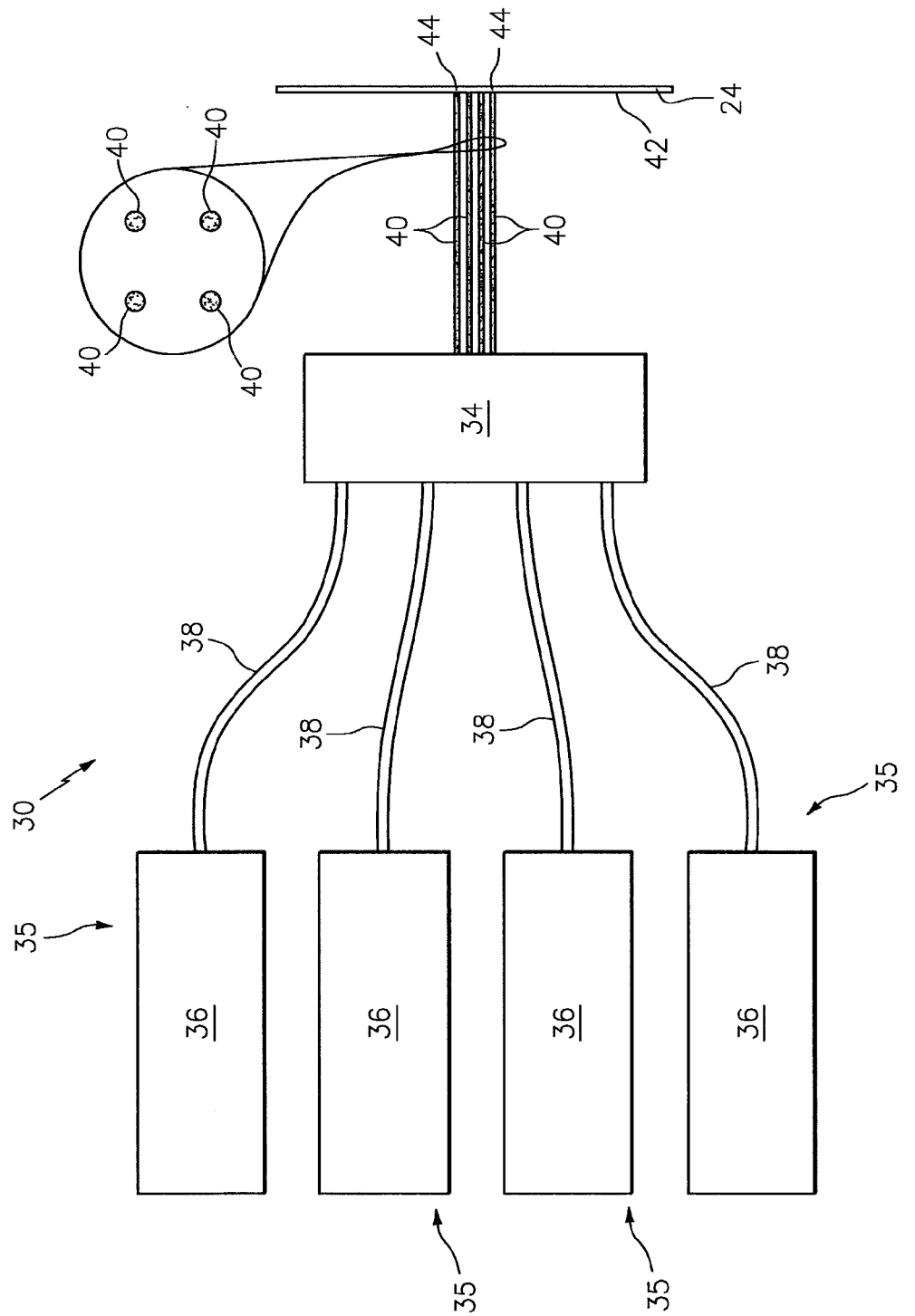
FIG. 2 is a block diagram of a laser system for forming the apertures.

The laser system 30 is adapted to concurrently form (e.g., cut) a plurality of the apertures 22 in the object 24, which apertures 22 may be through-holes, dimples, grooves, channels, recessions, indentations, notches, etc. The laser system 30 of FIG. 2, for example, includes a plurality of lasers 35 optically coupled with the scanner head 34. Note, these lasers 35 are shown schematically together in FIG. 1 for ease of illustration.

Each of the lasers 35 may be configured as an infrared (IR) laser and/or pulsed laser. Each of the lasers 35 may also or alternatively be configured as a fiber laser. Each of the lasers 35 of FIG. 2, for example, is configured as an infrared pulsed fiber laser. Each of these lasers 35 includes a laser beam source 36 and a length of optical fiber 38, which optically couples the laser beam source 36 with the scanner head 34.

The laser beam sources 36 are adapted to respectively generate a plurality of laser beams 40, which are shown schematically together in an array in FIG. 1 for ease of illustration. Each laser beam source 36 may be configured as or otherwise include, for example, a laser diode; e.g., an infrared laser diode.

The optical fibers 38 are adapted to respectively direct the laser beams 40 generated by the laser beam sources 36 to the scanner head 34. Each optical fiber 38 may be configured as, for example, a length of flexible, hollow glass fiber capable of transmitting the laser beam 40 through reflectance.

The scanner head 34 is adapted to receive the laser beams 40 from the optical fibers 38, direct these laser beams 40 into a substantially parallel array of laser beams 40, and scan these parallel laser beams 40 over at least a portion of the object 24. The scanner head 34 may also be adapted to change pitch and/or focal lengths of one or more or each of the laser beams 40 during and/or before/after the scanning. The term "scan" may describe a process of directing a laser beam 40 along a path over an object 24 and/or to one or more discrete points on the object 24. The term "pitch" may describe inter-laser beam spacing (e.g., distances between adjacent laser beams 40) at a surface 42 of incidence of an object 24, which is therefore also related to inter-aperture spacing of a pattern of apertures 22 formed by those laser beams 40. The teem "focal length" may describe a distance between the scanner head 34 and focal points of the laser beams 40, which points 44 are where the laser beams 40 converge to their smallest diameters and greatest energy densities, and which may be adjusted or set to be where the laser beams 40 are incident with an object 24.

Figure 3:
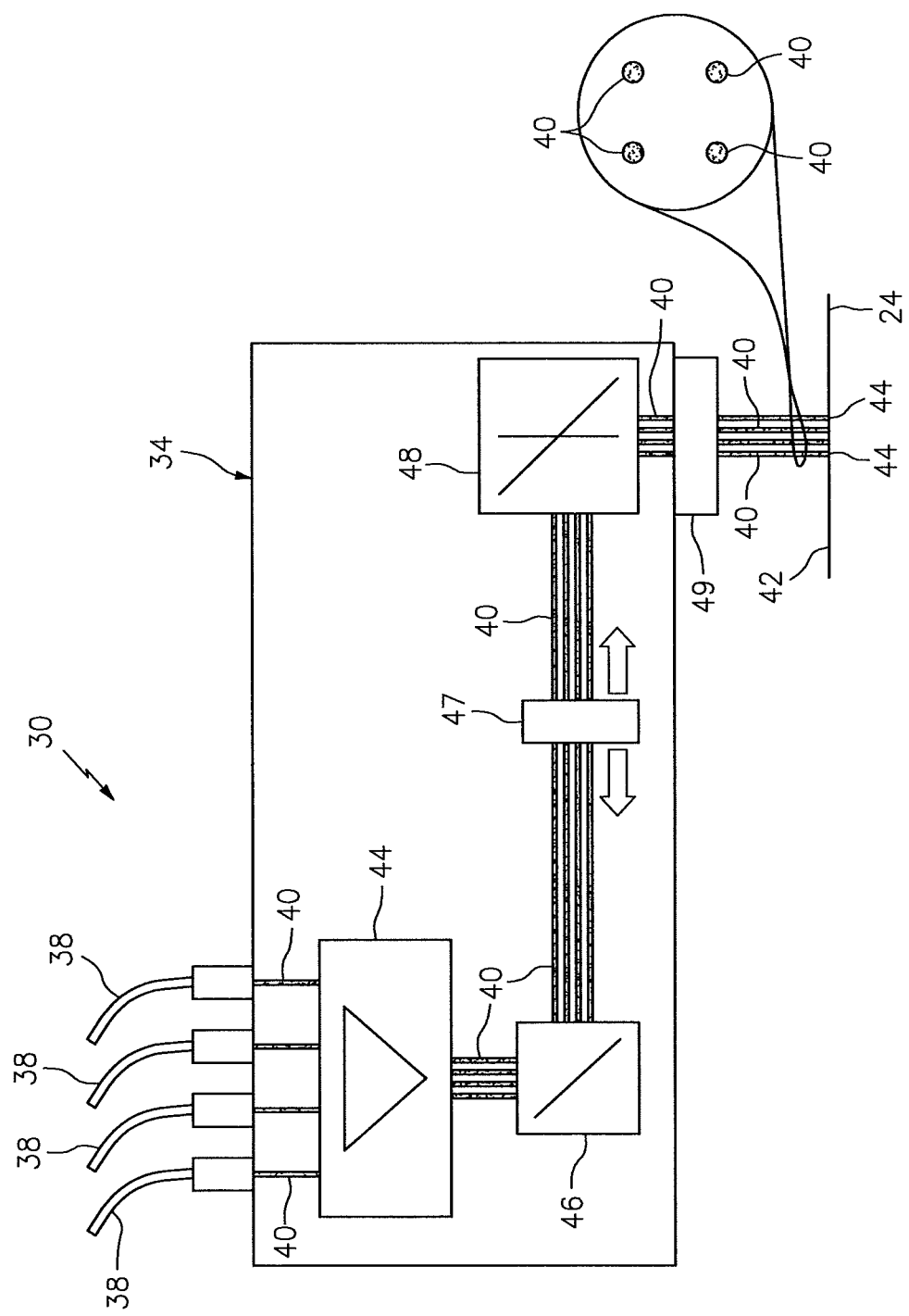
FIG. 3 is a schematic illustration of a scanner head for the laser system.
Figure 4:
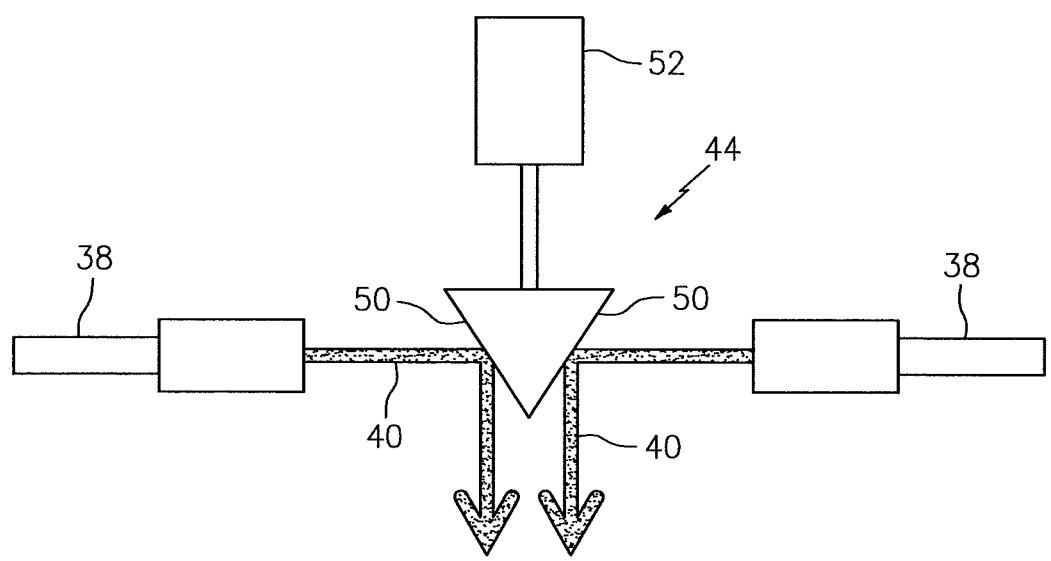
FIG. 4 is a side view schematic illustration of a laser beam multiplexer for the scanner head.
Figure 5:
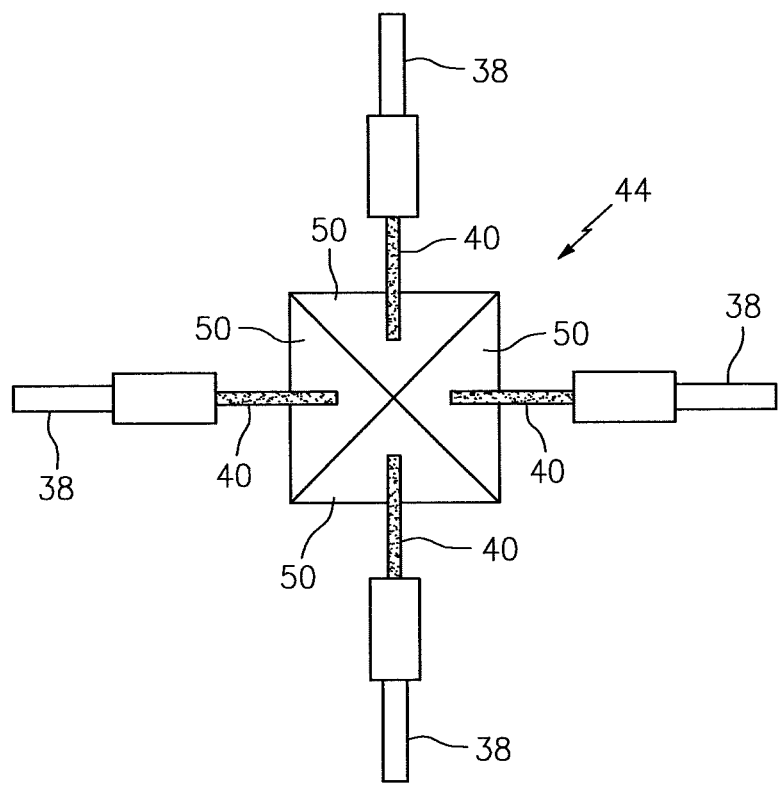
FIG. 5 is a bottom view block diagram of the laser beam multiplexer.

The scanner head 34 of FIG. 3 includes a laser beam multiplexer 44 as well as a plurality of other optical elements 46-49. Referring to FIGS. 4 and 5, the laser beam multiplexer 44 is adapted to multiplex the laser beams 40 received from the optical fibers 38, which may be received along non-parallel and/or opposite trajectories, into the substantially parallel array of laser beams 40; e.g., a rectangular array of four or nine or any other number of laser beams 40.

The laser beam multiplexer 44 of FIGS. 4 and 5 is configured as a polyhedral, prismatic mirror; e.g., a pyramidal mirror. This laser beam multiplexer 44 may be formed from four triangular mirrors 50 connected together in a pyramid shape, where reflective surfaces of these mirrors 50 face outwards. Each of the mirrors 50 is configured so as to reflect and thereby redirect a respective one of the laser beams 40 from its first trajectory onto a second trajectory. This second trajectory is substantially parallel to second trajectories of the other multiplexed laser beams 40. It is worth noting, while the laser beam multiplexer 44 is described above as a pyramidal mirror, other multiplexer 44 configurations and constructions are also contemplated and within the scope of the present disclosure; see FIGS. 10 and 11 which are described below in further detail.

The laser beam multiplexer 44 may be connected to an actuator 52 as shown in FIG. 4. This actuator 52 is adapted to translate the laser beam multiplexer 44 along a longitudinal path, which may be substantially parallel to trajectories of the just multiplexed laser beam array. By translating the laser beam multiplexer 44, points of incidence on the mirrors 50 are changed. For example, by moving the laser beam multiplexer 44 down relative to FIG. 4, the points of incidence will be higher on the mirrors 50 and, thus, laterally farther away from one another which in turn will make the laser beams 40 in the multiplexed array farther away from one another. Therefore, by moving the laser beam multiplexer 44 down relative to FIG. 4, the pitch as well as inter-aperture 22 spacing may be increased. In contrast, by moving the laser beam multiplexer 44 up relative to FIG. 4, the pitch as well as inter-aperture 22 spacing may be decreased.

Figure 6:
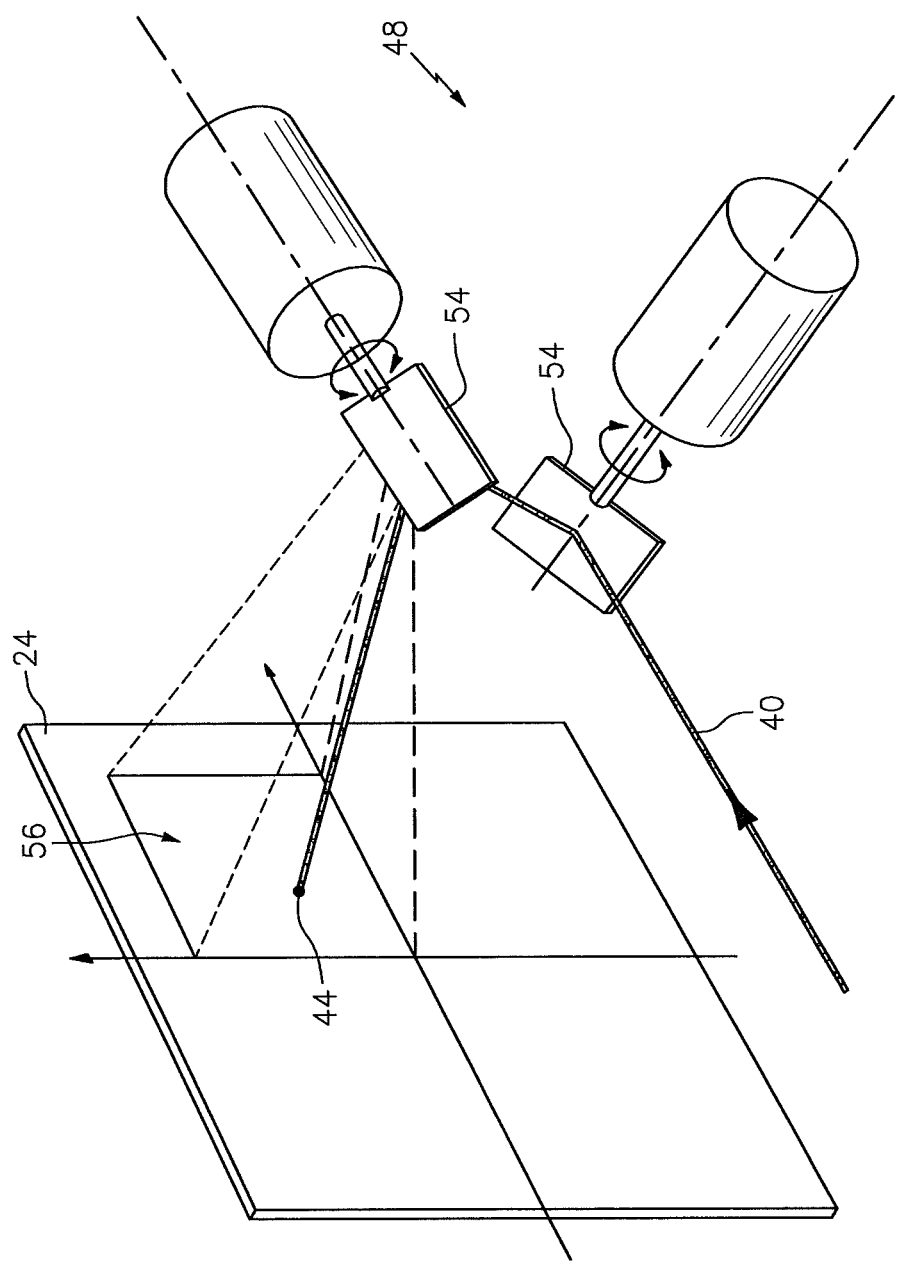
FIG. 6 is a block diagram of an optical element with galvo mirrors for the scanner head.

Referring to FIG. 3, each of the other optical elements 46-49 may be adapted to filter, focus and/or redirect one or more or each of the laser beams 40. The first element 46, for example, may be configured as a bending mirror. The first element 46 is adapted to direct the array of laser beams 40 multiplexed by the laser beam multiplexer 44 through the second element 47 and to the third element 48. The second element 47 may be configured as a lens, which translates back and forth between the optical elements 46 and 49. The second element 47 is adapted to change a focal length of the laser beam 40; e.g., expand the array of laser beams 40. Referring to FIG. 6, the third element 48 may include one or more (e.g., single-axis) galvo mirrors 54. The third element 48 is adapted to direct the array of laser beams 40 through the fourth element 49 (see FIG. 3) to various points on the object 24 within a scan area 56; e.g., an area on the object 24 where the laser beams 40 may be directed without moving the scanner head 34. Referring again to FIG. 3, the fourth element 49 may be configured as a stationary focusing lens. The fourth element 49 is adapted to focus the array of laser beams 40 to the focal points 44.

Referring to FIG. 1, the controller 32 (e.g., a processing system) is adapted to signal one or more of the system components 28 and 30 to perform at least a portion of the method described below. The controller 32 may be implemented with a combination of hardware and software. The hardware may include memory and one or more single-core and/or multi-core processors. The memory may be a non-transitory computer readable medium, and adapted to store the software (e.g., program instructions) for execution by the processors. The hardware may also include analog and/or digital circuitry other than that described above.

Figure 7:
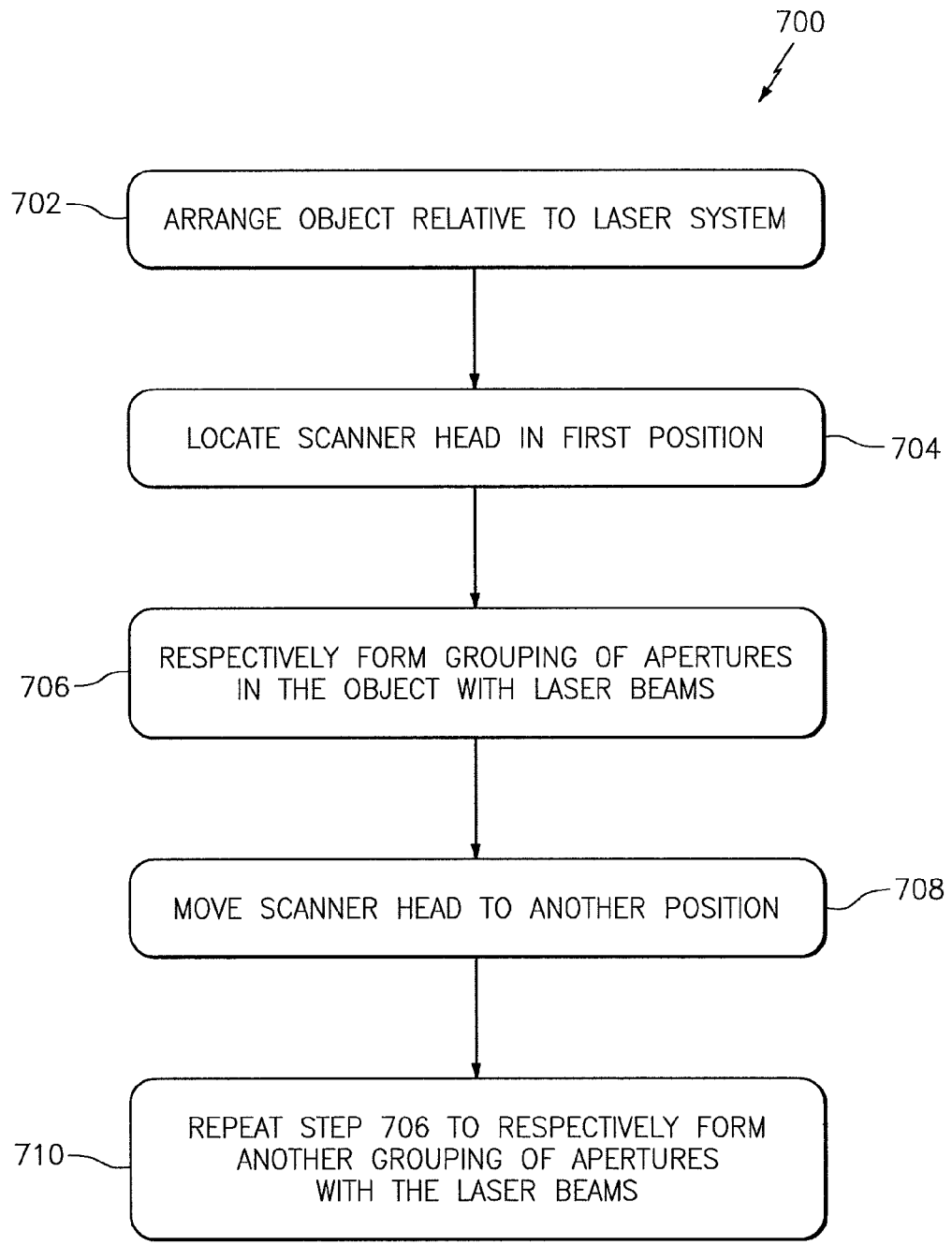
FIG. 7 is a flow diagram of a manufacturing method which utilizes a laser system.

FIG. 7 is a flow diagram of a manufacturing method 700 which utilizes a laser system such as the laser system 30 described above. During this method 700, a plurality of apertures 22 are formed in an object 24. These apertures 22 are formed in a plurality of groupings/patterns 58 of two or more of the apertures 22 (see FIGS. 8 and 9). As described below in further detail, the apertures 22 in each grouping 58 are formed concurrently in the object 24 by the laser system 30. In this manner, the method 700 forms the apertures 22 in a grouping-by-grouping fashion. The method 700 therefore may significantly reduce manufacturing time relative to prior art methods which form a plurality of holes in a one-by-one fashion.

Examples of an aperture 22 include a circular through-hole and a non-circular through-hole. Other examples of an aperture 22 include a dimple, a groove, a channel, a recession, an indentation and a notch. The process 700 and the system, of course, may also or alternatively form one or more apertures 22 other than the exemplary ones described above. However, the apertures 22 are referred to below as holes for ease of description.

The object 24 may be constructed from a fiber-reinforced composite and/or any other type of laser abatable material. Exemplary fiber-reinforced composites may include, but are not limited to, carbon fiber, fiberglass and/or Kevlar® fiber embedded within a thermoplastic or thermoset matrix. The object 24 may be configured as a component of a turbine engine; e.g., an aircraft propulsion system. For example, the object 24 may be configured as a perforated face sheet (or an intermediate sheet) of an acoustic panel for a turbine engine nacelle. Such an acoustic panel may include at least one porous (e.g., honeycomb) core, and may be included as part of an inner barrel, an inner fixed structure (IFS) of the turbine engine nacelle, a blocker door, or the like. The method 700 and the system 20, however, may also or alternatively form one or more apertures (e.g., holes) in objects other than those described above or included in a turbine engine.

In step 702, the object 24 is arranged relative to the laser system 30. More particularly, the object 24 is arranged relative to the scanner head 34; e.g., next to the scanner head 34, or in any other position where the scanner head 34 may be moved so as to form the holes 22 in the object 24. The object 24, for example, is positioned and secured on the base 26.

In step 704, the scanner head 34 is located in a first position. The controller 32, for example, may signal the manipulator 28 to move the scanner head 34 from a starting position to the first position next to the object 24 and the base 26.

Figure 8:
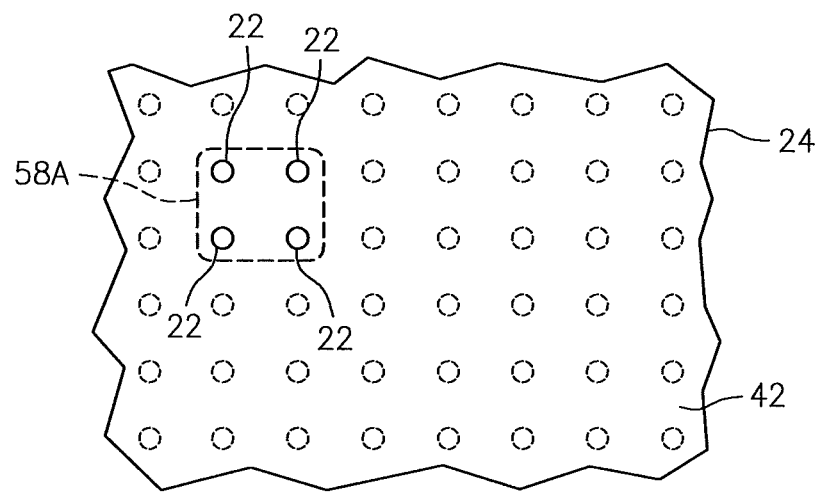
FIG. 8 is diagrammatic illustration of a portion of an object with a pattern of apertures formed therein and ghost lines showing where patterns of apertures are to be formed therein.

In step 706, the laser system 30 forms a grouping 58A (e.g., sub-set) of the apertures 22 in the object 24; see FIG. 8. The controller 32, for example, signals the laser beam sources 36 to generate the laser beams 40. These laser beams 40 are directed from the laser beam sources 36 to the scanner head 34 through the optical fibers 38. The laser beams 40 are multiplexed by the laser beam multiplexer 44 into the array of substantially parallel laser beams 40. The scanner head 34 directs the multiplex laser beam array onto the surface 42 of the object 24 at respective target locations; e.g., each laser beam is incident with its own target location. The laser beams 40 subsequently ablate respective portions of the object 24 material and thereby concurrently (e.g., simultaneous, at the same time) form the grouping 58A of holes 22. It is worth noting, the scanner head 34 may be operated so as to scan (e.g., move) the laser beams 40 over the surface 42 in order to use laser machining techniques such as trepanning; however, such techniques are not required or limited to trepanning.

The apertures 22 may be formed in a pattern such as, for example, a rectangular array of holes; e.g., a square array of four holes. The method 700 and the system 20, however, are not limited to forming the grouping of apertures 22 in the foregoing exemplary pattern. The pattern, for example, may alternatively be another type of polygonal array; e.g., a triangular array, hexagonal array, etc. Still alternatively, the pattern may be a circular array, a straight linear array, a curvilinear array, or any other type of array. The array may only include perimeter apertures 22, or may also include interior apertures 22 such as is the case in a square 3×3 array.

In step 708, the scanner head 34 is moved to another position. The controller 32, for example, may signal the manipulator 28 to move the scanner head 34 from the first position, at which the first grouping 58A of apertures 22 were formed, to the other position next to the object 24 and the base 26.

Figure 9:
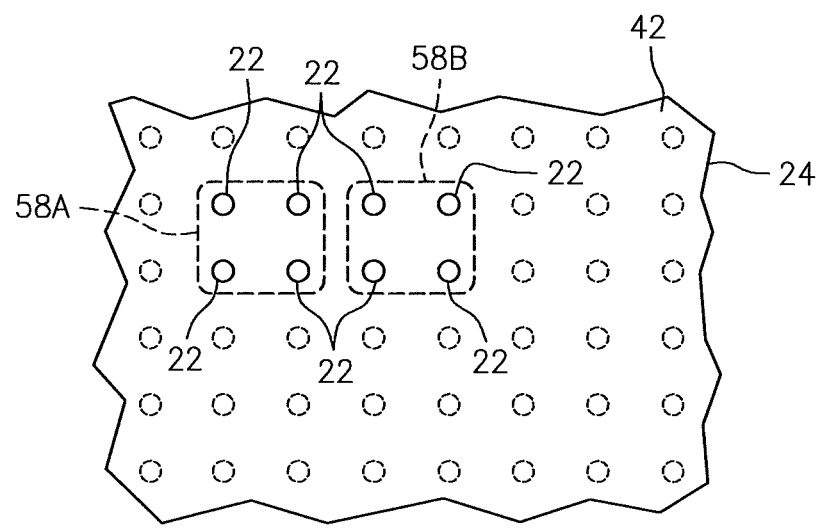
FIG. 9 is diagrammatic illustration of a portion of an object with two patterns of apertures formed therein and ghost lines showing where patterns of apertures are to be formed therein.

In step 710, the step 706 is repeated with the scanner head 34 in the other position so as to form another grouping 58B of the apertures 22 in the object 24; see FIG. 9. The steps 708 and 710 may subsequently be repeated in order to form one or more additional groupings 58 of the apertures 22 in the object 24.

In embodiments where the object 24 is a sheet, layer or other component of an acoustic panel, this sheet may be connected to one or more other components (e.g., layers) of the acoustic panel before the step 702 or after the step 710.

In some embodiments, the laser beam multiplexer 44 may be translated before or during the method 700 in order to adjust laser beam 40 and, thus, aperture 22 pitch.

Figure 10:
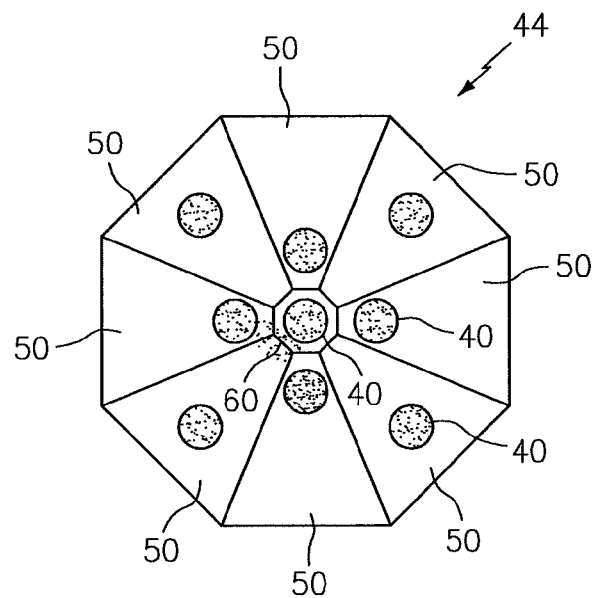
FIGS. 10 and 11 are bottom view schematic illustrations of alternate embodiment laser beam multiplexers.
Figure 11:
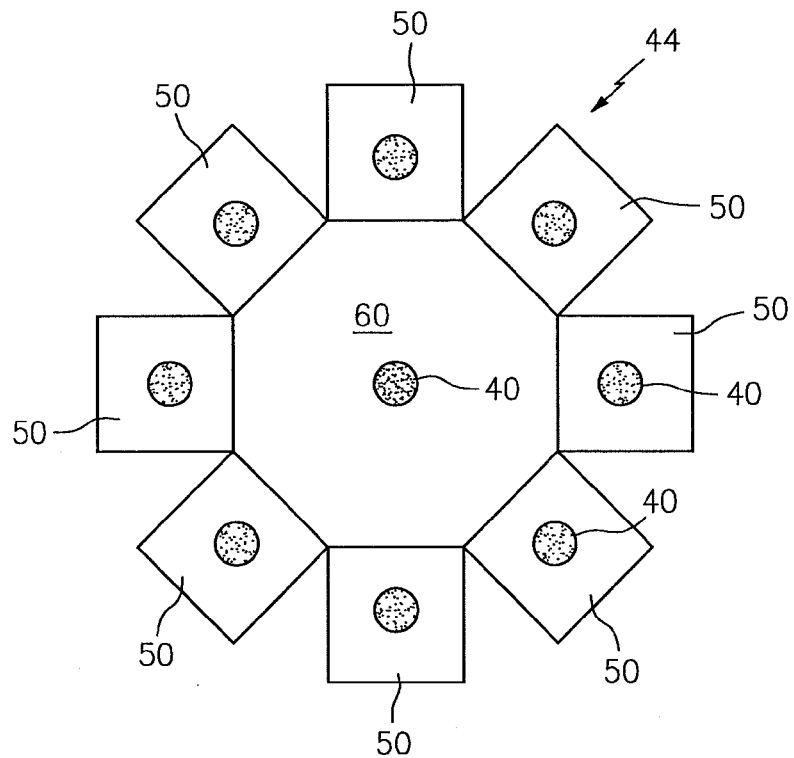

FIGS. 10 and 11 illustrate alternative embodiments of the laser beam multiplexer 44. In these embodiments, the laser beam multiplexer 44 is configured to multiplex nine laser beams 40 together. In contrast to the laser beam multiplexer 44 of FIGS. 4 and 5, this laser beam multiplexer 44 includes a central aperture 60 through which at least one of the laser beams 40 (e.g., a central laser beam) may pass. The mirrors 50 or reflective surfaces therefore reflect and thereby redirect the other laser beams 40 to follow trajectories which are substantially parallel with the central laser beam.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A manufacturing method utilizing a laser system, comprising:
   arranging an object relative to a head of the laser system, wherein the head includes a laser beam multiplexer; and
   concurrently forming a pattern of holes in the object by ablating the object with a plurality of laser beams which are directed from the head, wherein at least some of the laser beams are incident with the laser beam multiplexer; and
   translating the laser beam multiplexer to adjust inter hole spacing of the pattern of holes;
   wherein the object is configured as at least a portion of an acoustic panel.

2. The manufacturing method of claim 1, wherein the pattern of holes is a rectangular array of holes.

3. The manufacturing method of claim 1, wherein the object comprises a fiber-reinforced composite.

4. The manufacturing method of claim 1, wherein the laser beam multiplexer redirects at least some of the laser beams such that the laser beams are directed on substantially parallel trajectories.

5. The manufacturing method of claim 1, further comprising:
   moving the head from a first position to a second position, wherein the pattern of holes is formed while the head is in the first position; and
   forming another pattern of holes in the object by ablating the object with a plurality of laser beams which are directed from the head while the head is in the second position.

6. A manufacturing method utilizing a laser system, comprising:
   arranging an object relative to a head of the laser system;
   forming a pattern of apertures in the object by ablating the object with a plurality of laser beams which are directed from the head;
   wherein the head includes a laser beam multiplexer which redirects at least some of the laser beams such that the laser beams are directed on substantially parallel trajectories; and
   translating the laser beam multiplexer to adjust inter hole spacing of the pattern of holes.

7. The manufacturing method of claim 6, wherein the laser beam multiplexer comprises a prismatic mirror with which at least some of the laser beams are incident.

8. The manufacturing method of claim 6, wherein the pattern of apertures comprises a pattern of four holes.

9. The manufacturing method of claim 6, wherein the pattern of apertures comprises a pattern of nine holes.

10. The manufacturing method of claim 6, wherein the object comprises a fiber-reinforced composite.

11. The manufacturing method of claim 6, wherein the object is configured as at least a portion of an acoustic panel for a turbine engine.

12. The manufacturing method of claim 6, wherein the laser system includes a plurality of lasers, each laser generates a respective one of the laser beams, and each laser beam ablates the object to foul' a respective one of the apertures in the pattern.

13. The manufacturing method of claim 6, wherein the pattern of apertures is a rectangular array of holes.

14. The manufacturing method of claim 1, wherein
   a first of the laser beams is incident with a first surface of the laser beam multiplexer; and
   a second of the laser beams is incident with a second surface of the laser beam multiplexer that is positioned opposite the first surface.

15. The manufacturing method of claim 1, wherein
   the laser system includes a plurality of lasers, and each of the lasers generates a respective one of the laser beams;
   a first of the lasers is configured to direct a respective one of the laser beams onto a first side of the laser beam multiplexer; and
   a second of the lasers is configured to direct a respective one of the laser beams onto a second side of the laser beam multiplexer that is opposite the first side.

16. The manufacturing method of claim 1, wherein
   the laser system includes a plurality of lasers, each of the lasers generates a respective one of the laser beams;
   an end portion of an optical fiber of a first of the lasers is positioned on a first side of the laser beam multiplexer; and
   an end portion of an optical fiber of a second of the lasers is positioned on a second side of the laser beam multiplexer.

* * * * *